United States Patent [19]

Vail

[11] Patent Number: 4,618,066
[45] Date of Patent: Oct. 21, 1986

[54] COMBINED INSULATED DRINKING MUG AND MEGAPHONE

[75] Inventor: John G. Vail, Oakland, Calif.

[73] Assignee: Mug-A-Phone, Inc., Daytona Beach, Fla.

[21] Appl. No.: 642,585

[22] Filed: Aug. 20, 1984

[51] Int. Cl.[4] ............................................. A47J 41/00
[52] U.S. Cl. ............................. 215/12 R; 215/13 R; 215/230; 229/1.5 B; 62/457
[58] Field of Search ............... 215/1 C, 12 R, 12 A, 215/13 R, 100 A, 222, 230, 332, 334, 355, 366; 229/1.5 B; 62/457

[56] References Cited

U.S. PATENT DOCUMENTS

| | | |
|---|---|---|
| 1,223,338 | 4/1917 | Fritzsch . |
| 2,000,419 | 5/1935 | Sarber ................... 215/13 R |
| 2,507,843 | 5/1950 | Wheeler . |
| 2,526,165 | 10/1950 | Smith ........................ 62/457 |
| 2,899,098 | 8/1959 | Gits .......................... 215/13 R |
| 2,925,187 | 2/1960 | Bramming ............... 215/13 R |
| 3,113,831 | 12/1963 | Coale ........................ 215/13 R |
| 3,362,556 | 1/1968 | Waldrum .................. 215/355 |
| 3,374,911 | 3/1968 | White ....................... 215/12 R |
| 3,504,816 | 8/1968 | Weichsel .................. 215/12 R |
| 3,861,565 | 1/1975 | Rickmeier, Jr. .......... 215/13 R |
| 3,900,122 | 8/1975 | Dichter .................... 215/355 |
| 3,902,617 | 9/1975 | Valyi ........................ 215/1 C |
| 4,048,361 | 9/1977 | Valyi ........................ 215/1 C |
| 4,062,652 | 12/1977 | Rolfo-Fontana ........ 215/1 C |
| 4,125,218 | 11/1978 | DeBoer . |
| 4,261,502 | 4/1981 | Ohmori .................... 229/1.5 B |
| 4,372,453 | 2/1983 | Branscum ................ 215/13 R |
| 4,397,397 | 8/1983 | Herr ......................... 215/222 |
| 4,402,195 | 9/1983 | Campbell ................. 62/457 |
| 4,485,637 | 12/1984 | Campbell ................. 215/13 R |

Primary Examiner—Joseph Man-Fu Moy
Assistant Examiner—David Fidei
Attorney, Agent, or Firm—Manfred M. Warren; Robert B. Chickering; Glen R. Grunewald

[57] ABSTRACT

Disclosed is an inventive apparatus which is interchangeably useful as a container or a megaphone. The apparatus includes a rigid, hollow, double-walled body open at its bottom through an outlet and opened at its top through a port. The apparatus is designed to be hand-held. A removable and reinsertable cap and base are designed to fit respectively into the port and outlet. When inserted, the cap and base make the body useful as a temperature maintaining potable liquid container. When removed, the cap and base open the body for use as a megaphone.

2 Claims, 6 Drawing Figures

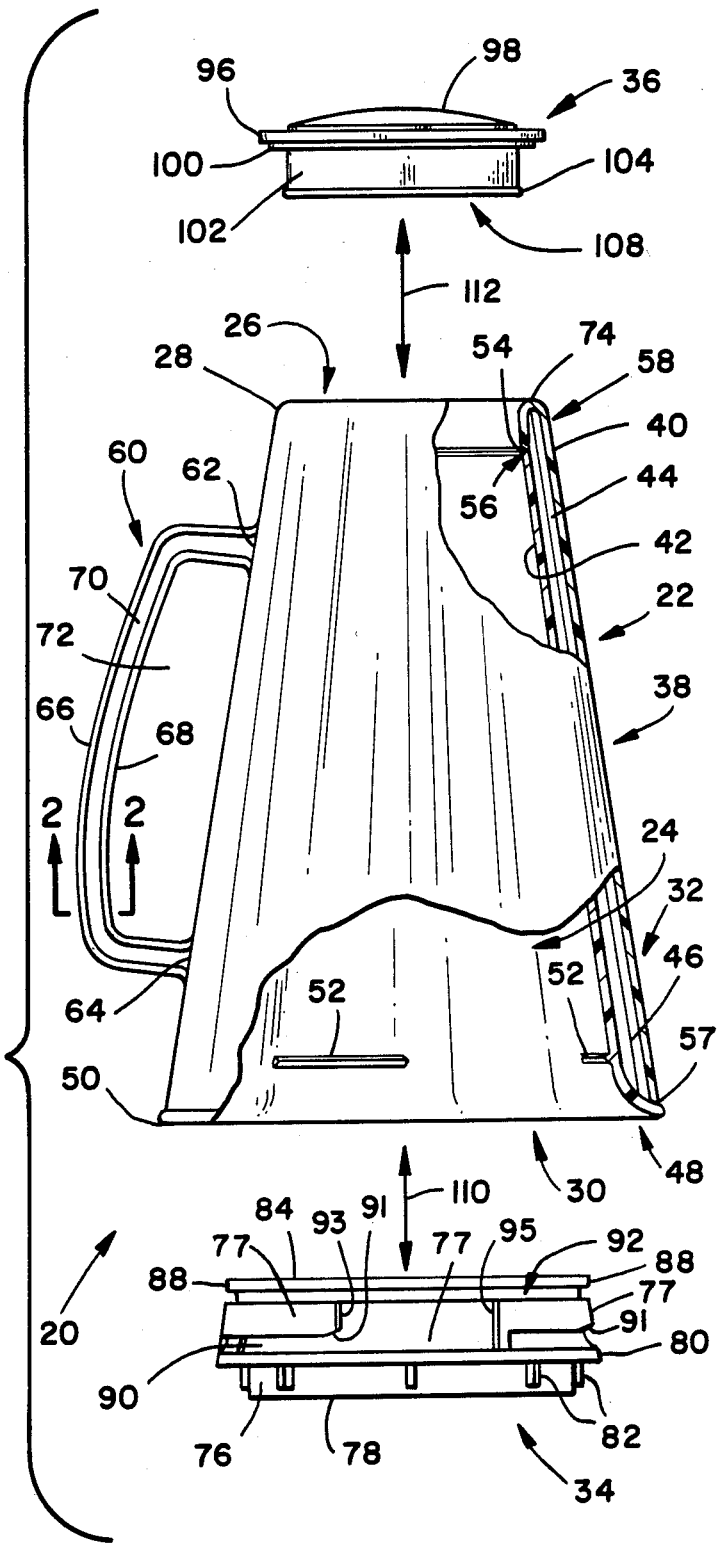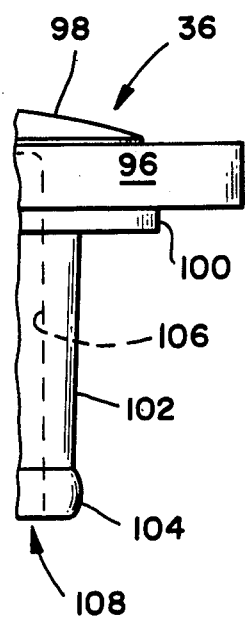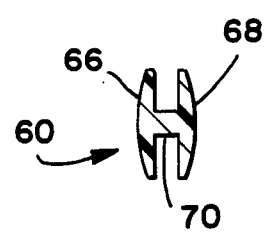
FIG _ 3
FIG _ 1
FIG _ 2

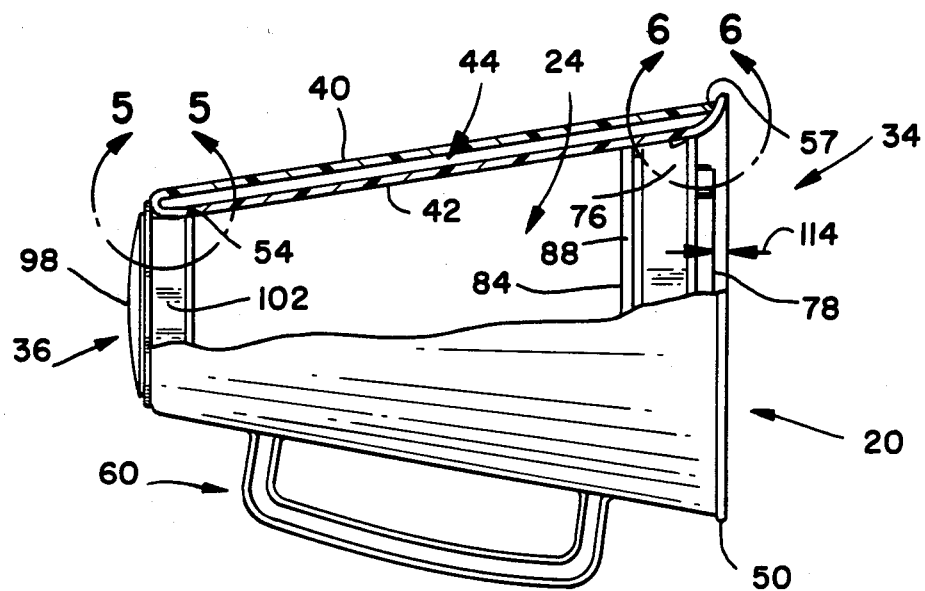
FIG_4
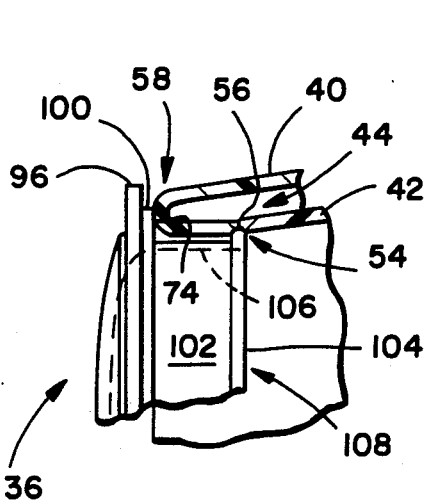
FIG_5
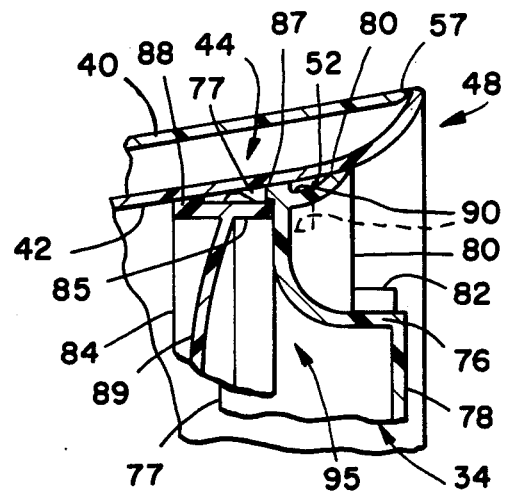
FIG_6

COMBINED INSULATED DRINKING MUG AND MEGAPHONE

BACKGROUND OF THE INVENTION

The field of this invention relates generally to food containers which are convertible for other uses, and more particularly to potable liquid containers which are convertible into megaphones.

Attempts have previously been made to combine a megaphone with a container with various degrees of success. U.S. Pat. No. 4,125,218 to DeBoer, for example, discloses a megaphone cup device having a conical shape. The device is truncated and sealed at its smaller end with an end wall. Thus assembled, the cup can be used as a container for beverages, snack foods and the like. For use as a megaphone, the end wall is broken loose along a scored rim. Once removed, the structure becomes a permanent megaphone in that the end wall cannot be reinserted. Therefore, after being converted for use as a megaphone, the structure cannot again be used as a cup.

U.S. Pat. No. 2,507,843 to Wheeler discloses a food-carrying container apparatus which is convertible into a megaphone. The container is made of paper, is initially folded flat to have a triangular shape when viewed from the side, and in use is unfolded to form a cone-like structure. Thus unfolded, the container can be used to carry dry foods such as popcorn. To convert the container into a megaphone, the bottom is torn off the base to expose a smaller opening through which a human user can shout. The container is not suitable for use with liquids. Also, once converted into a megaphone, the apparatus cannot be re-converted back into a food-carrying container.

It is, of course, well known that a double-walled megaphone or speaker will be useful in sound amplification, see, e.g., U.S. Pat. No. 1,223,338, but such devices have not been incorporated in any manner into combined containers and megaphones. Moreover, such double-walled resonant chambers are often open at the large diameter end which can be very disadvantageous if attempting to use them as containers.

Several deficiencies reside in these existing containers. Some are not durable because they are made from thin deformable and destructible paper. They also lack thermal insulation, and the containers, therefore, permit heat transfer so any liquid held by the container will soon have the same temperature as the ambient environment. Additionally and very importantly, the container function must be destroyed in order to convert the container into a megaphone; the base of the container must be permanently removed.

SUMMARY OF THE INVENTION

This invention offers a durable, combined, liquid container and megaphone having features which improve over existing structures.

Broadly stated, the invention includes an apparatus for use as a potable liquid container in a closed mode and as a megaphone in an open mode. The apparatus comprises a rigid hollow body or double-walled shell which is open at its bottom through an outlet and open at its top through a port. Structure, such as a handle, provides means for manually grasping the body. Parts such as a cap and a base, provide means for removably and reinsertably sealing the port and the outlet as desired. When inserted, these sealing means render the body useful in its closed mode as a temperature-maintaining, potable liquid container. When the sealing means are removed, this opens the body for use in its open mode as a megaphone.

Further features and embodiments include an apparatus wherein: the body is formed from a transparent outer wall so matter positioned beneath the exterior surface of the body is visible; the body is formed to provide thermal insulation of materials contained in the body; the body wall comprises an exterior shell joined in spaced relation to an interior liner; the means for sealing the lower outlet comprises a circular base having circumferentially disposed grooves for sealing, and the outlet region of the body has a plurality of tongues aligned and sized to receive the grooves to lock the base in the outlet so liquid cannot pass through the outlet.

Several advantages are offered by this invention over previous technology. The cap and base can be repeatedly removed and reinserted, so removal of cap or base does not permanently change the overall structure of the body. The body is made of tough nondeformable plastic so it can endure for a long period of time. Insulation provided by the construction of the body a double wall interacting with a hollow or double-walled base permits the device to act as a thermos.

BRIEF DESCRIPTION OF THE DRAWING

FIG. 1 is a partially cut-away exploded side elevation view of the embodiment according to the invention;

FIG. 2 is a section view of the FIG. 1 handle taken through line 2—2;

FIG. 3 is an enlarged partially cut-away view of a portion of the cap shown in FIG. 1;

FIG. 4 is a partially cut-away side view of the invention when assembled as a container;

FIG. 5 is an enlarged, fragmentary, side elevation view of a portion of the joined cap and body bounded by line 5—5 in FIG. 4; and FIG. 6 is an enlarged, fragmentary, side elevation view bounded by line 6—6 in FIG. 5 and showing the base mounted in the body.

DETAILED DESCRIPTION OF THE PREFERRED EMBODIMENT

Described below and shown in the Drawings is a specific embodiment of that which the inventor considers at present to be the best mode of fabrication, assembly and operation of the invention. This is a necessarily narrow particular example of one of many possible ways to practice the claimed invention, which is much broader in scope, as defined by the appended claims.

The FIG. 1 exploded view shows the major components of container/megaphone apparatus 20. Within a truncated right conical body 22 is defined a chamber 24. Chamber 24 is open through a port 26 positioned toward a top 28 of body 22. Further, chamber 24 is open through an outlet 30 provided toward a bottom 32 of body 22.

To make apparatus 20 useful as a container for potable liquids, a base 34 is fabricated to be secured into outlet 30 to prevent liquid from passing through outlet 30. A liquid, therefore, may be poured into chamber 24 and a cap 36 inserted into port 26.

For use as a megaphone, apparatus 20 is converted by removing cap 36 and base 34. The user can then grasp body 22, hold port 26 to his mouth, and shout through chamber 24 and out through outlet 30.

Detail: Body

Body 22 has a rigid wall 38 fabricated from an exterior truncated right circular conical shell 40, joined in spaced apart relation to an interior truncated right circular conical liner 42. An airspace 44 is provided between shell 40 and liner 42 to provide thermal insulation for insulating liner 42 from shell 40. Airspace 44 may additionally provide a resonance chamber and some sound amplification, because its primary function is thermal insulation, it is preferable that the airspace be sealed or confined by the walls of body 22. Shell 40 is preferably fabricated from a transparent material through which people can see an advertisement or other printed matter, either on the exterior side of liner 42 or on an insert 46 positioned in space 44. Airspace 44, therefore, can do double duty as both a display area and insulating means.

To enhance the megaphone aspect of body 22, a divergent horn-like portion 48 having an edge 50 is provided toward outlet 30. A plurality of tongues 52 are mounted to extend away from the interior surface of liner 42 toward the longitudinal centerline of body 22. Tongues 52 preferably lie in a plane which is perpendicular to this center line. Tongues 52 are formed to receive and securely mount base 34 to body 22.

To accomodate cap 36, body 22 has an internal circumferential notch 54 provided toward port 26. Notch 54 is positioned adjacent a cap-end joint 56, which is the point at which shell 40 is joined to liner 42. As shown in FIG. 5, shell 40 is provided with a J-bend 58 which curves the shell around to meet liner 42 for their joining at cap-end joint 56. Notch 54 is a depression for gripping a bead 104 on cap 36, as is described below. J-bend 58 has an outwardly facing port defining edge 74 against which flange portion 100 of cap 36 rests, as also is more fully described below. Toward bottom 32, shell 40 is joined to liner 42 toward outlet 30 at a base-end joint 57.

For grasping apparatus 20, a handle 60, shown in FIG. 1 as a side view and in FIG. 2 as a sectional view, is preferably secured to wall 38 at a joint 62 and a joint 64 between port 26 and outlet 30. For added strength, handle 60 includes a set of parallel legs 66, 68, joined together with a perpendicular web 70. Handle 60 extends away from wall 38 to provide a slot 72 large enough to accommodate a hand of a human user. In place of a handle 60, body 22 can be sized for grasping by a human user.

Detail: Base

FIGS. 1, 4 and 6 show additional details of base closure member 34 and the relation of these details with respect to divergent end portion 48 and tongues 52 of body 22.

In order to provide thermal insulation for the bottom of the megaphone-mug, it is preferable that the base or lower end closure member 34 also be formed as a double-walled member. Thus, base 34 can advantageously be formed as two elements which are secured together to define a thermal insulating space therebetween. Outer element 76 includes a liner engaging rim 80 which is frusto-conical in shape to mate with liner 42 just above tongues 52. Member 76 also includes a second frusto-conical liner engaging wall portion 77 axially spaced with respect to rim 80.

Formed in member 76 between rim 80 and portion 77 is a groove 90 dimensioned for receipt of tongues 52. As best may be seen in FIG. 1, groove 90 includes a tapered inlet ramp surface 91, and wall 77 of member 76 is relieved radially inwardly between shoulders 93 and 95. Thus, a bayonet connection is provided in wall 77 so that end closure 34 can be axially urged past tongues 52 and then rotated so that ramps 91 will cinch the frusto-conical portion 77 and rim 80 into sealed relation with liner 42. Rotation of base member 34 is facilitated by ribs 82.

Additional sealing and thermal insulation is provided by forming base 34 with a second member 84 having a liner engaging rim portion 88 and an outwardly extending skirt portion 85 terminating in a circumferentially extending bead 87. Bead 87 mates with a groove in the inside of wall 77 of member 76 so members 84 and 76 can be resiliently snapped together.

Extending transversely across member 84 is a wall 89 which defines with member 76 (and particularly end wall 78) a space 95 in base 34. Space 95 provides thermal insulation, and space 95 can be used to temporarily store small items (e.g., coins, hairpins, keys, etc.) since members 76 and 84 can be pulled apart or separated from each other.

Detail: Cap

FIGS. 1, 3, 4 and 6 show additional details of cap 36 and the relation of these details to body 22. Cylindrical cap 36 includes a rim 96 attached to a dome 98 to extend away from body 22. A circular lip 100 is provided on rim 96 on a side opposite from dome 98.

Extending away from lip 100 toward body 22 is a skirt portion 102, which terminates at its outside edge in a resiliently deformable bead 104. An inside surface 106 defines a hollow 108 extending inside neck 102, lip 100 and rim 96. Bead 104 is sized to deformably and frictionally mate with notch 54 of body 22, as described in the operation of the apparatus below.

Detail: Operation

Apparatus 20 is useful (1) in a closed mode as a container for potable liquids, and (2) in an open mode as a megaphone.

In use as a container for liquids, base 34 is moved axially, as indicated by arrow 110, toward body 22, with tongues 52 positioned to fit between shoulders 93 and 95. Once tongues 52 are proximate ramps 91 to grooves 90, base 34 is twisted manually by ribs 82 to slide tongues 52 into locking relationship with grooves 90. This forms a tight seal between base 34 and body 22 as rims 80 and 88 and wall portion 77 all tightly engage liner 42. Liquid poured into chamber 24, therefore, cannot leak past base end closure 34.

Next, a liquid at a given temperature is poured into chamber 24. Insulation provided by airspace 44 between liner 42 and shell 40 and by space 95 in base 34 assists in passively maintaining the liquid at the initial temperature. To enhance this temperature insulating feature, as well as to decrease risk of spilling the liquid (not shown), cap 36 is mounted in opening 26, as indicated by arrow 112. When bead 104 contacts the inner surface of wall 38, bead 104 deforms and slides along wall 38 in the direction of notch 54. Once adjacent notch 54, bead 104 returns to its original expanded position to frictionally secure cap 36 in port 26.

Because base 34 has a diameter greater than that of cap 36, the construction and assembly of apparatus 20 provides a very stable liquid container. Apparatus 20 has a low center of gravity. Base 34, when attached to body 22 on tongues 52, is recessed by a distance shown as a setback 114 away from end 50. Surface 78 of base 34 does not contact the flat support (surface) on which end 50 may be placed when the megaphone/mug is set down.

Of course, body 22 can be configured in a reverse fashion with opening or port 26 having the tongues 52 into which base having bayonet grooves can be placed. Likewise, a cap similar to cap 36 and having a larger diameter, can be mounted in outlet 30. However, the superior arrangement for stability is as shown in the drawing.

For use as a megaphone, apparatus 20 is configured in the open mode, wherein base 34 and cap 36 are removed from body 22. This opens chamber 24 through port 26 and outlet 30. The user, by placing ports 26 close to his mouth, can shout through chamber 24.

While the above best mode describes a full and complete disclosure of a specific embodiment or embodiments of the invention, it is noted that various modifications, alternate constructions and equivalents can be employed without departing from the true spirit and scope of the invention. Therefore, the above description and interrelated drawings shall not be construed as limiting the invention. The actual scope of the invention is defined by the breadth of the appended claims.

What is claimed is:

1. An apparatus for use as a liquid container in a closed mode and as a megaphone in an open mode, the apparatus comprising:
    (a) a rigid, hollow, frusto-conical body formed by a pair of continuous walls joined together in spaced-apart relation to define therebetween a frusto-conical, annular resonating chamber and thermal insulating space extending over substantially the entire height of the body, the walls terminating in and defining an outlet opening at a bottom, large diameter end of the body and an open port at the top, small diameter end of the body, the walls being integrally joined together proximate the port by a circumferentially extending joint positioned in axially spaced relationship to the small diameter end with one of the walls extending between the inside and the outside of the body to provide a smooth, continuous wall portion at the port for engagement by the mouth of the user, and the walls being joined together proximate the outlet opening by a circumferentially extending joint maintaining the walls in spaced relationship substantially over the height of the body;
    (b) sealing means formed for selective repeated mounting to and removal from the body in a position sealing the outlet, the sealing means being provided as an end closure mounted to the body by a bayonet coupling structure including mating cooperating sets of bayonet elements with one set of bayonet elements provided on the inside wall of the body proximate and axially inwardly of the outlet and of the body, and mating set of bayonet elements provided on the end closure, the bayonet structure locking the end closure to the body to render the body useful in a closed mode as a liquid container and releasing the end closure for removal from the body to open the body for use in an open mode as a megaphone and
    a cap formed for selective repeated mounting to and removal from the body in a position closing the port, the cap and the port being matingly dimensioned to frictionally retain the cap mounted in the port.
2. The apparatus as defined in claim 1 wherein, the cap is provided iwth a downwardly depending neck dimensioned for mating sliding engagement with the inside of the body proximate the port, the neck being formed with a circumferentially extending bead positioned on the ncek, and the circumferentially extending joint proximate the port being formed in the inside of the body at a position cooperating with the bead on the neck to frictionally retain the cap in the port.

* * * * *

UNITED STATES PATENT AND TRADEMARK OFFICE
CERTIFICATE OF CORRECTION

PATENT NO. : 4,618,066
DATED : October 21, 1986
INVENTOR(S) : John G. Vail

It is certified that error appears in the above-identified patent and that said Letters Patent are hereby corrected as shown below:

IN THE CLAIMS:

Claim 1, Col. 6, line 19, delete "and" in the first occurrence and insert ---end---.

Claim 2, Col. 6, line 36, after "on the" delete "ncek" and insert ---neck---.

Signed and Sealed this

Twenty-third Day of December, 1986

*Attest:*

DONALD J. QUIGG

*Attesting Officer*  *Commissioner of Patents and Trademarks*